April 12, 1966 J. E. BIENICK ETAL 3,245,298
SHEARING DEVICE
Filed May 4, 1964 7 Sheets-Sheet 1

INVENTORS.
JULIUS E. BIENICK
WILLIAM H. VANDER VENNEN
ARTHUR PETERSON
BY

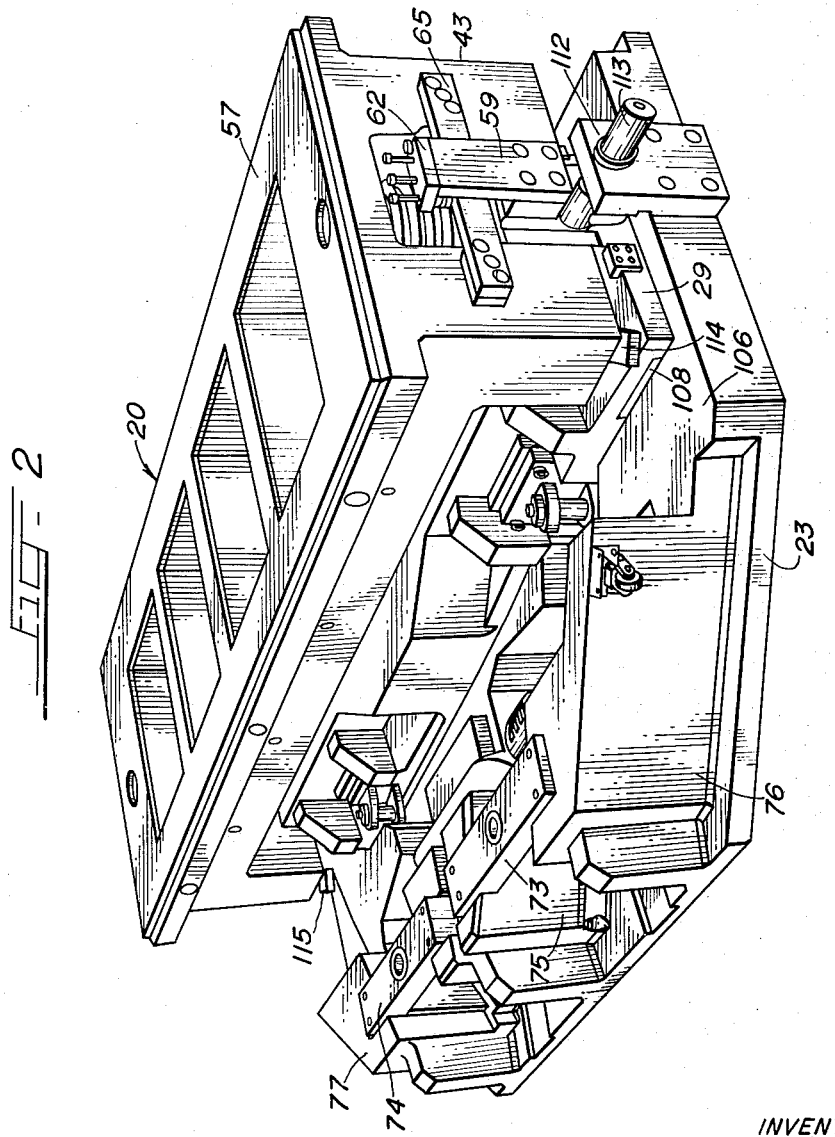

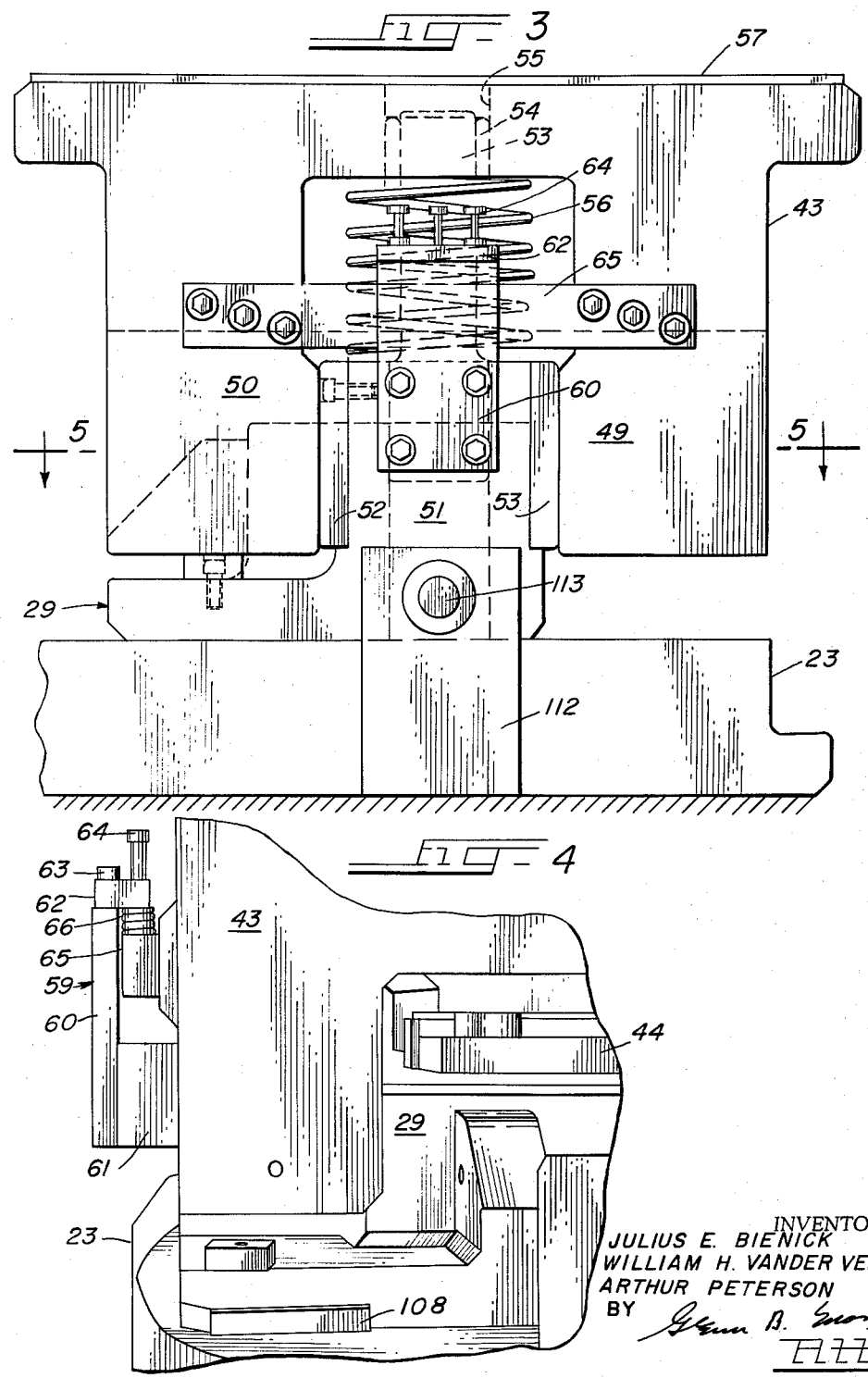

April 12, 1966 J. E. BIENICK ETAL 3,245,298
SHEARING DEVICE
Filed May 4, 1964 7 Sheets-Sheet 4
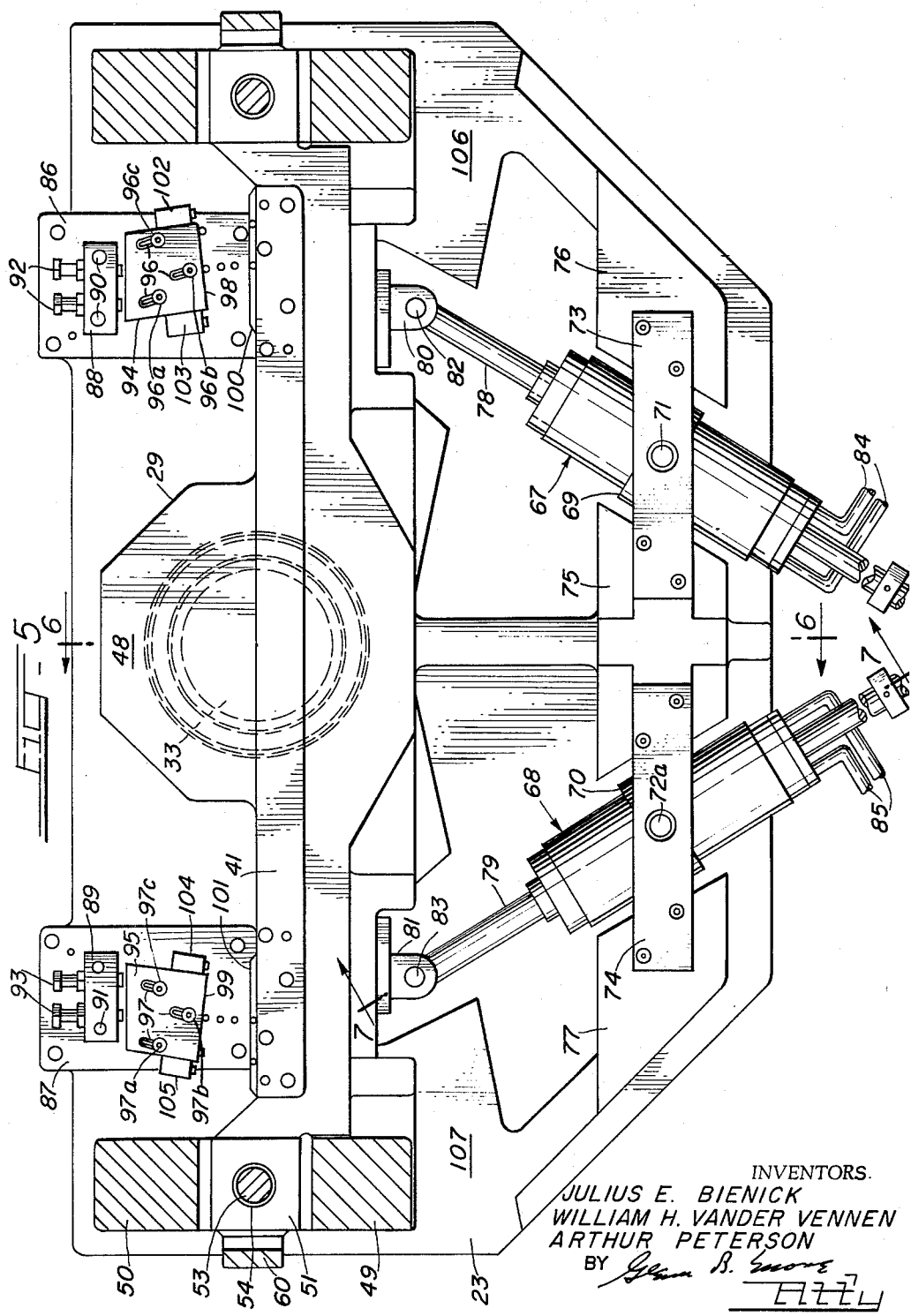
INVENTORS.
JULIUS E. BIENICK
WILLIAM H. VANDER VENNEN
ARTHUR PETERSON

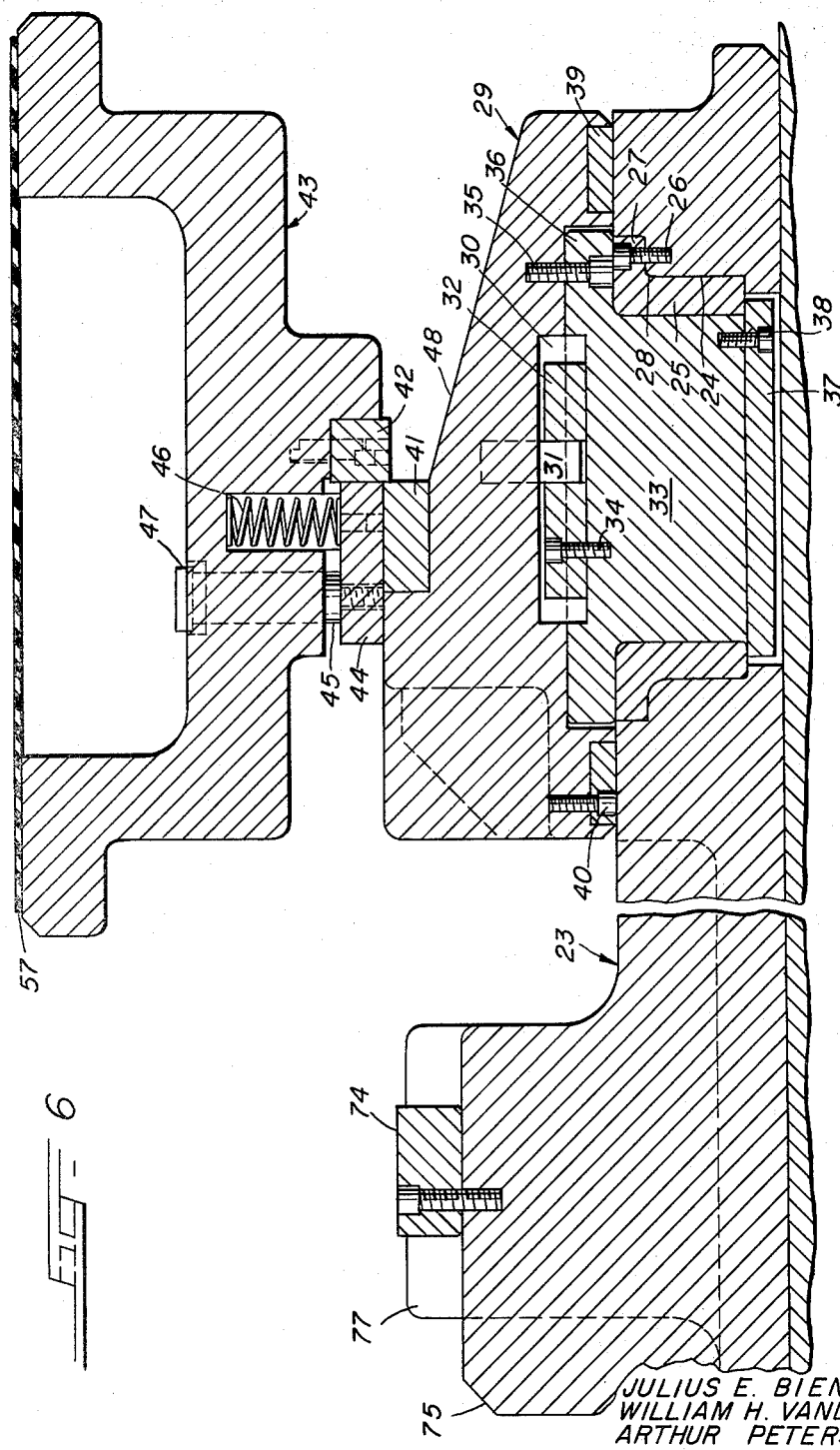

April 12, 1966   J. E. BIENICK ETAL   3,245,298
SHEARING DEVICE
Filed May 4, 1964   7 Sheets-Sheet 6
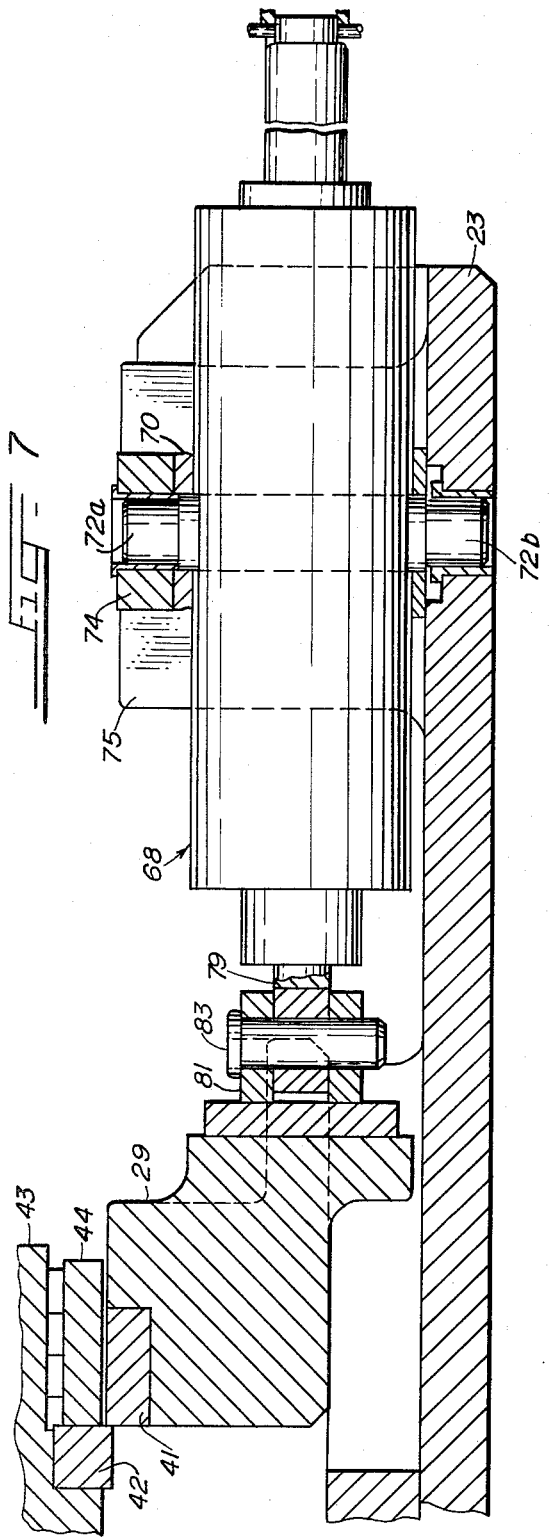
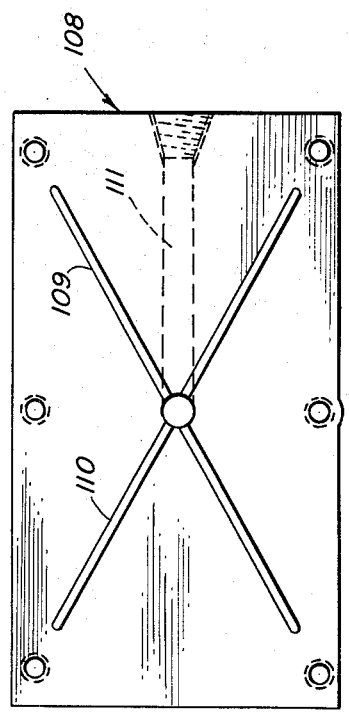
INVENTORS.
JULIUS E. BIENICK
WILLIAM H. VANDER VENNEN
ARTHUR PETERSON

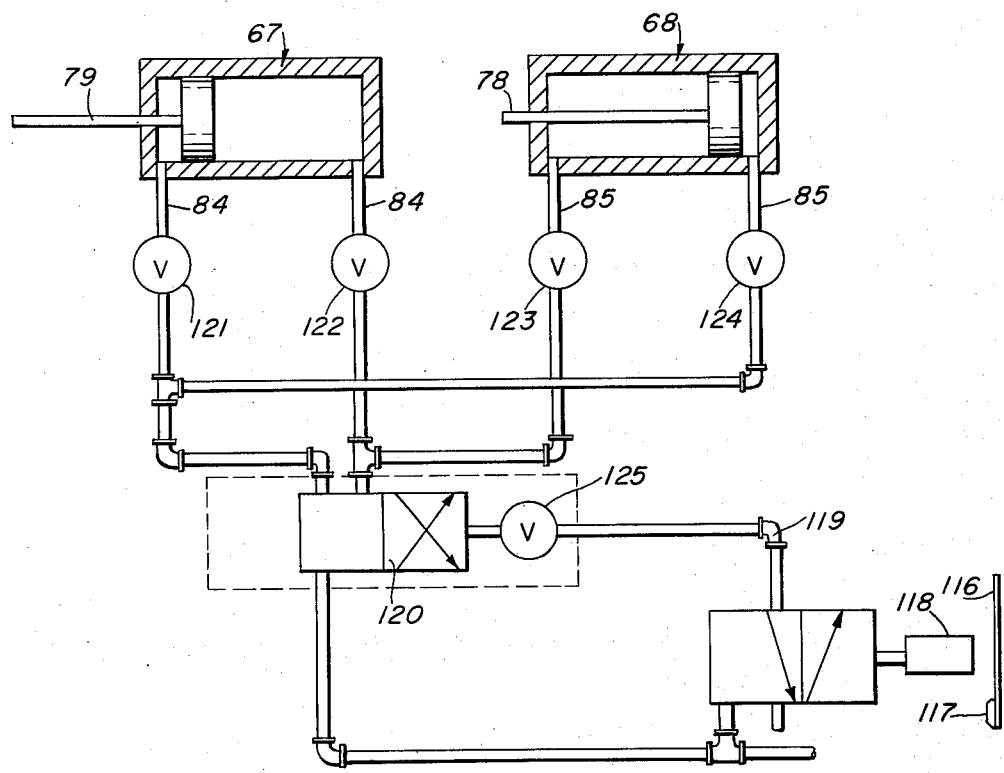

United States Patent Office 3,245,298
Patented Apr. 12, 1966

3,245,298
SHEARING DEVICE
Julius E. Bienick, 1319 Mayfield NE.; William H. Vander Vennen, 716 Billanntau SE.; and Arthur Peterson, 1405 Forrester SE., all of Grand Rapids, Mich.
Filed May 4, 1964, Ser. No. 364,605
3 Claims. (Cl. 83—215)

There are many instances where it becomes desirable to cut trapezoidal pieces of sheet material from a long strip. In the manufacture of large non-rectangular doors and panels for household appliances, for example, a designer has the choice between making these parts from rectangular blanks, or using a trapezoidal blank more closely approximating the pattern of the steel actually required. The latter represents a considerable saving of material, but equipment that will shear trapezoidal blanks from a continuous strip of steel of substantial width has been so costly, and occupies so much floor space, as to limit the use of trapezoidal blanks.

This invention provides a mechanically simple shearing machine that is readily received in a conventional punch press without significant modification of the press, and without interference with standard stock-feeding equipment. Essentially, the machine includes a base normally secured to the bed of the press, and a shearing device pivotally mounted on the base for rotation on a usually vertical axis. A pneumatic or hydraulic actuating unit preferably operates between the base and the shearing device to switch it back and forth between pre-determined positions at each stroke of the press, the movement taking place while the press is open, and while the stock is feeding to a new shearing position. This switching of the line of shear with respect to the edges of the strip of stock produces the trapezoidal blank formation.

The several features of the invention will be analyzed in detail through a discussion of the particular embodiments illustrated in the accompanying drawings. In the drawings:

FIGURE 2 is a perspective view of the machine with the actuating mechanism removed.

FIGURE 3 is a view on an enlarged scale at the side of the shearing device.

FIGURE 4 is a fragmentary front elevation of the area shown in FIGURE 3, and particularly illustrating the device for controlling the rebound of the shearing machine.

FIGURE 5 is a sectional view in the plane 5—5 of FIGURE 3, showing particularly the base member and the lower shearing member of the machine.

FIGURE 6 is a section on an enlarged scale in the plane 6—6 of FIGURE 5.

FIGURE 7 is a section on an enlarged scale on the plane 7—7 of FIGURE 5.

FIGURE 8 is a schematic view showing the pneumatic circuit used in the machine.

FIGURE 9 is a bottom view of a bearing plate for supporting the shearing device.

Figure 1:
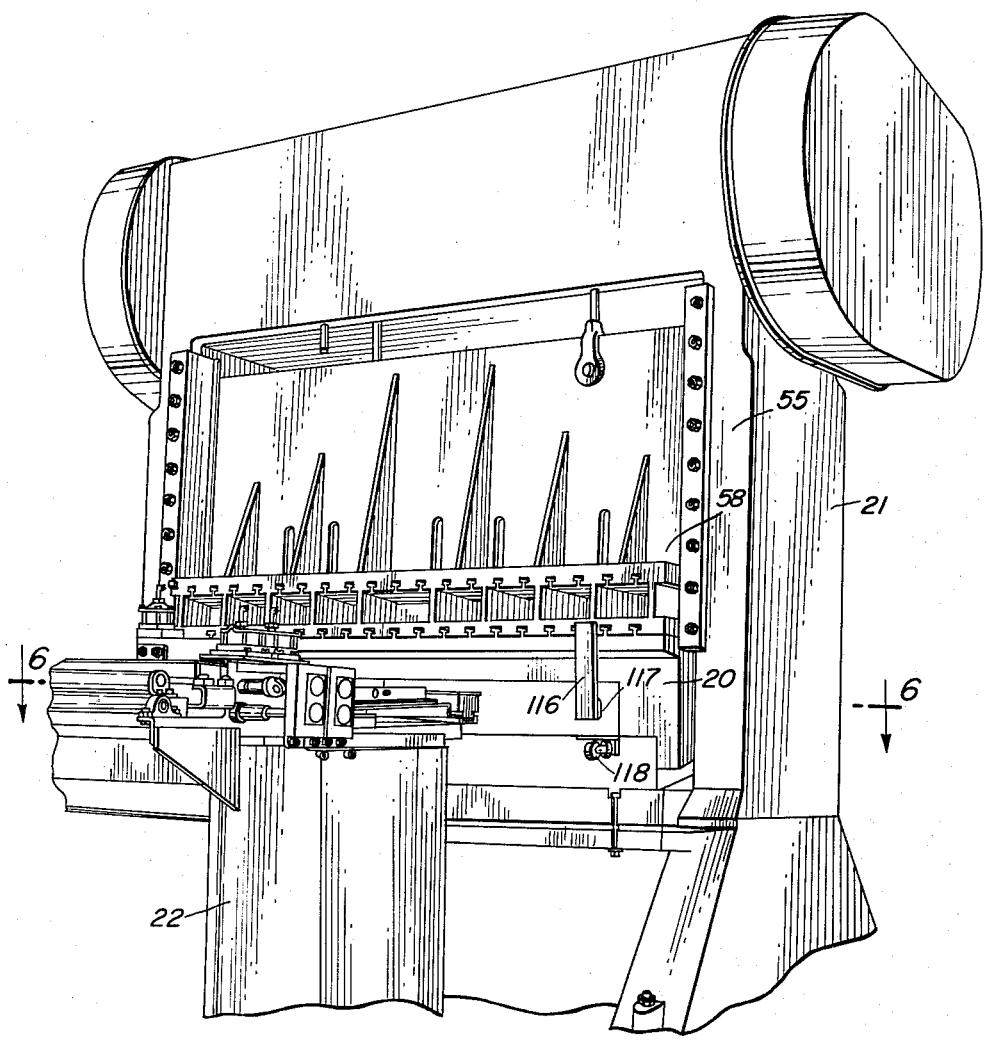
FIGURE 1 is a perspective view of a standard punch press with a "switching shear" installed in it, and showing a portion of a conventional stock-feeding installation.

In FIGURE 1, the switching shear indicated at 20 is shown installed in a conventional punch press 21. The automatic stock-feeding device shown at 22 is conventional, and includes a battery of power-driven rollers operative to advance a strip of sheet steel through the punch press 21 in definite increments. The details of construction of the press 21 and the feeding equipment 22 form no part of the present invention.

The shearing device, or "switching shear," indicated at 20, includes a heavy base casting 23 with a central recess 24 receiving a bearing sleeve 25. (Refer to FIGURE 6). A series of screws 26 engaging the flange 27 of the sleeve secures the flange to the shoulder 28 machined in the base casting 23. The lower shearing member 29 is provided with a recess 30 in its underside, and a locating pin 31 is fixed accurately with respect to the shearing member 29. A plate 32 has a central opening engaging the locating pin 31, and this plate is secured to the fulcrum projection 33 by a series of screws 34. When the locating function has been completed, the fulcrum projection 33 is secured firmly to the lower shear member 29 by the screws 35 engaging the flange 36. The fulcrum projection 33 and the bearing sleeve 25 function as journal and bearing, permitting the shearing device to pivot upon the axis of the sleeve 25. The assembled relationship of the components is maintained by the retaining plate 37 secured to the fulcrum projection 33 by the screws 38. The plate 37 overlaps the lower extremity of the sleeve 25 as shown, preventing upward withdrawal of the lower shear member 29 with respect to the base casting 23. A bearing ring 39 is preferably incorporated in the lower shear member 29, and is secured by the screws 40.

The lower shear member 29 has a shearing steel 41 operating in conjunction with the shearing steel 42 of the upper shearing member 43. The hold-down bar 44 is mounted on the guide rods 45 that reciprocate within vertical bores in the upper shearing member 43. A series of springs 46 urges the hold-down bar toward the lower extremity of its freedom of movement, determined by the flange 47 on the guide rods 45. During the downward movement of the upper shearing member 43, the hold-down bar 44 will first contact the stock moving through the shearing device in the direction of the arrow in FIGURE 6. The stock will then be held firmly in place as the upper shearing steel 42 operates in conjunction with the lower shearing steel 41 to cut off a blank of steel stock, which then slides down the slope 48 into suitable receiving equipment (not shown).

The upper shearing member 43 is mounted for limited reciprocating movement with respect to the lower shearing member 29 by two systems of guideways. The construction on the opposite sides of the shearing device is similar, and this portion of the structure is best shown in FIGURE 3. The upper shearing member has a pair of spaced abutments indicated at 49 and 50, and the lower shearing member has a portion 51 received between these abutments in a close sliding fit. The bearing pads 52 and 53 are secured to the portion 51 as replaceable inserts, and to provide better wearing surfaces. The engagement of the portion 51 (together with the pads 52 and 53) with the abutments 49 and 50 at the opposite sides of the shearing device accurately maintains the alignment of the shearing steels 41 and 42 in the direction of movement of the sheet stock through the device. This is extremely critical, since the cleanness of the shearing action is determined by the accurate maintenance of the relationship of these members.

In addition to the engagement of the abutments 49 and 50 with the portions 51, the pin 53 is fixed on a vertical axis to the lower shearing member 29, and engages the bearing 54 received in the bore 55 of the upper shearing member 43. The primary function of the pins 53 is to maintain the alignment of the upper and lower shearing members 29 and 43 in a direction parallel to the line of shear. The forces involved in maintaining the alignment in this direction are much less severe, although the engagement of the pins 53 and bearings 54 tends to supplement the guiding action of the portion 51 to prevent the upper shearing member 43 from tipping in a clockwise or counter-clockwise direction as shown in FIGURE 4.

Springs 56 surrounding the pins 53 serve to bias the upper shearing member upwardly to an open position providing clearance between the steels 41 and 42 to permit passage of the sheet stock through the shearing device. Normally, the upper shearing member will not be secured to the ram of the press 21. On the upward stroke of the press, the ram will normally leave the shearing device, and will contact it again on the next down stroke. To cushion the engagement between the ram and the shearing device, it is preferable to incorporate a layer of rubber as shown at 57. The presence of this material will reduce the shock and noise, and the freedom from the necessity of securing the upper shearing member 43 to the ram simplifies the installation and removal of the shearing device from the press. The arrangement also eliminates the necessity of accurately predetermining the stroke of the press to conform with the needs of the shearing device.

On the upward stroke of the ram 58 of the press 21, the action of the spring 56 tends to maintain a considerable upward velocity of the upper shearing member 43. As the upward movement continues beyond the normal rest position, the inertia of the upper shearing member 43 tends to continue this velocity, which then causes the unit to move beyond the point of equilibrium between weight and spring force, and to fall back somewhat and oscillate about a neutral position. To control this rebound tendency, it is preferable to incorporate on the opposite sides of the shearing device an arresting mechanism generally indicated at 59 in FIGURE 4. This mechanism includes an arm 60 secured at its lower extremity to the abutment 61 mounted on the lower shearing member 29. A shelf 62 is secured to the top of the arm 60 by the screws 63, and a group of bolts 64 engages the abutment 65 on the upper shearing member 43. Compression springs 66 surround the bolts 64, and the function of these is indicated in FIGURE 4. At the upward extremity of the stroke of the shearing device, the abutment 65 and the shelf 62 approach closely enough to begin the compression of the springs 66. These impart a cushioning action to the upward movement of the upper shearing member, preventing it from being "thrown." The spring constant of the springs 66 (taken together) will normally be sufficiently different from that of the springs 56 to avoid a common resonant frequency.

The switching of the shearing device between the predetermined angular positions with respect to the base 23 is accomplished by the pneumatic actuators 67 and 68. These devices are embraced by the yokes 69 and 70, respectively, which are pivotally mounted on diametrically opposite journals 71a–b and 72a–b in bearings which are carried by the base 23 and the bars 73 and 74. These bars bridge between the central abutment 75 on the base 23 and the outer abutments 76 and 77. Sufficient clearance exists between these abutments to accommodate the small degree of angular articulation of the acuators as the shearing device is swung between its limit positions. The piston rods 78 and 79 are pivotally connected to the brackets 80 and 81, respectively, by the pins 82 and 83, which are secured to the lower shearing member 29. Suitable air lines 84 and 85 are associated with the actuators, and control of the admission and exhaust of air to these lines serves to control the angular position of the shearing device with respect to the base member 23.

It is conventional to provide actuators of the type shown at 67 and 68 with self-contained stop devices which determine the limit positions of the stroke. In addition to these, the illustrated shearing device is equipped with a stop system which acts directly upon the lower shearing member to accurately position the shearing device with respect to the base 23. (Refer to FIGURE 5). A pair of mounting plates 86 and 87 are fixed with respect to the base 23. The blocks 88 and 89 are secured to these plates by screws 90 and 91, respectively, and provide a base for the adjusting bolts 92 and 93. The stop blocks 94 and 95 are provided with slots 96 and 97 receiving screws 96a–c and 97a–c which engage the plates 86 and 87, respectively. When these screws are loosened, manipulation of the bolts 92 and 93 will serve to accurately position the stop blocks 94 and 95. When the desired position has been reached, tightening of the screws 96a–c and 97a–c will maintain the position of the blocks 94 and 95. The faces 98 and 99 of these blocks may cooperate with the surfaces 100 and 101 on the lower shearing member 29 to establish the limit positions of movements of the shearing device. The blocks 94 and 95 also provide convenient points on which to mount the switches 102–103 and 104–105. The switches are engaged by the shearing device as it approaches the stop blocks 94 and 95, and may be used to control the air delivered to the actuators 67 and 68. They may also be used as detectors to determine when the shearing device has reached the full limit of its angular positioning.

The weight of the shearing device is supported primarily on the surfaces 106 and 107 of the base 23, and the weight of the shearing device is transferred to these surfaces by the plates 108 shown in FIGURE 9. These plates are provided with grooves 109 and 110 (in the bottom surface) which communicate with the conduit 111 normally connected to a pressure hydraulic system (not shown). Application of pressure to the conduit 111 will have the effect of applying this pressure over a major portion of the under surface of the plate 108, and will float the shearing device on this film of lubricant. The weight of the shearing device is such that this arrangement is strongly recommended as a means of reducing the air pressure requirements of the actuators 67 and 68.

It often becomes desirable to lock the shearing device in a position such that the line of shear is in a 90 degree relationship with the edge of the stock moving through the device. The presence of such a reference position of the machine also facilitates the installation of it in a punch press, and the proper alignment for either 90 degree or switch shearing. The locking of the shearing device in the 90 degree position is provided by the blocks 112 (refer to FIGURE 2) mounted on the base 23 at the opposite sides of the machine, and the heavy pins 113 that are slidably carried by these blocks and engage a suitable recess in the portion 51 of the lower shearing member. When it is no longer desired to maintain the locked position, the pins may be manually withdrawn outwardly until they become disengaged from the shearing device. It is also recommended that a pair of pads shown at 114 and 115 be mounted on the lower die member in the path of the portions 49 of the upper die member to limit the degree of downward movement of the upper shearing member in the event of breakage of the springs 56, or for any other reason which might induce damage to the mechanism. These pads may be either temporary or permanent.

The control of the actuators 67 and 68 is accomplished through the action of the arm 116, which is secured either to the upper shearing member, or to the ram of the press. (Refer to FIGURE 8). This arm has a cam 117 which cooperates with the roller 118 of the control valve 119. The output of this valve, in turn, controls the reversing valve 120, which determines the application of compressed air to the actuating cylinder units 67 and 68. Each stroke of the press will bring the cam 117 past the roller 118 to actuate the valve 119, and the effect of this will be to reverse the position of the valve 120. The reversal of the position of the valve 120 reverses the pressure-exhaust relationship of the conduits 84 and 85 through standard arrangements which form no part of this invention. The valves 119 and 120 are standard items readily available on the market.

The particular embodiments of the present invention which have been illustrated and discussed herein are for illustrate purposes only, and are not to be considered as a limitation upon the scope of the appended claims. In these claims, it is our intent to claim the entire invention disclosed herein, except as we are limited by the prior art.

We claim:
1. A machine for shearing strip material along transverse lines having different and alternating angular relationships to the edges of said strip material, said machine comprising:
   a base member;
   a shearing device pivotally mounted on said base member;
   a lower shearing member having a shearing edge, said lower shearing member being pivotally mounted on said base member for limited rotation on a normally vertical axis;
   an upper shearing member having a shearing edge disposed to cooperate with the shearing edge of said lower shearing member, said upper and lower shearing members having normally interengaged guideway means providing for relative movement between a position wherein said shearing edges are in shearing relationship and an open position providing clearance between said shearing edges, said upper shearing member being provided with a sheet of resilient cushioning material on the upper surface thereof; and
   actuating means operative to rotate said shearing members with respect to said base, when said shearing members are in an open position, between predetermined angular positions with respect to said base, and including control means responsive to cycles of relative movement between said shearing members.

2. A machine for shearing strip material along transverse lines having different and alternating angular relationships to the edges of said strip material, said machine comprising:
   a base member;
   a shearing device pivotally mounted on said base member;
   a lower shearing member having a shearing edge, said lower shearing member being pivotally mounted on said base member for limited rotation on a normally vertical axis;
   an upper shearing member having a shearing edge disposed to cooperate with the shearing edge of said lower shearing member, said upper and lower shearing members having normally interengaged guideway means providing for relative movement between a position wherein said shearing edges are in shearing relationship and an open position providing clearance between said shearing edges;
   actuating means operative to rotate said shearing members with respect to said base, when said shearing members are in an open position, between predetermined angular positions with respect to said base, and including control means responsive to cycles of relative movement between said shearing member; and
   a rebound device secured to one of said shearing members and having an arm extending to overlapping relationship with a portion of the other of said shearing members, said arm having a resilient stop engageable with an abutment on said other shearing member portion in an open position of said shearing members.

3. A machine for shearing strip material along transverse lines having different and alternating angular relationships to the edges of said strip material, said machine comprising:
   a base member;
   a shearing device pivotally mounted on said base member;
   a lower shearing member having a shearing edge, said lower shearing member being pivotally mounted on said base member for limited rotation on a normally vertical axis;
   an upper shearing member having a shearing edge disposed to cooperate with the shearing edge of said lower shearing member, said upper and lower shearing members having normally interengaged guideway means providing for relative movement between a position wherein said shearing edges are in shearing relationship and an open position providing clearance between said shearing edges, said guideway means including abutments on one of said shearing members spaced apart in a direction perpendicular to said shearing edges, the other of said shearing members having a portion closely and slidably received between said abutments, said guideway means also including interengaged guide pins and bearing means on said shearing members, respectively, disposed between said abutments; and
   actuating means operative to rotate said shearing members with respect to said base, when said shearing members are in an open position, between predetermined angular positions with respect to said base, and including control means responsive to cycles of relative movement between said shearing members.

References Cited by the Examiner

UNITED STATES PATENTS

| | | | |
|---|---|---|---|
| 1,700,856 | 2/1929 | Schein | 308—160 |
| 2,767,789 | 10/1956 | Budlong et al. | 83—559 |
| 3,122,042 | 2/1964 | Littell et al. | 83—215 |

WILLIAM W. DYER, Jr., *Primary Examiner,*

L. B. TAYLOR, *Assistant Examiner.*